(12) United States Patent
Carlson

(10) Patent No.: US 7,243,764 B2
(45) Date of Patent: *Jul. 17, 2007

(54) MAGNETICALLY ACTUATED FRICTION DAMPER

(75) Inventor: J. David Carlson, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/372,894

(22) Filed: Mar. 10, 2006

(65) Prior Publication Data

US 2006/0144657 A1 Jul. 6, 2006

Related U.S. Application Data

(62) Division of application No. 09/737,889, filed on Dec. 15, 2000, now Pat. No. 7,404,467.

(51) Int. Cl.
*F16F 15/03* (2006.01)
(52) U.S. Cl. ............... 188/267; 188/378; 188/164; 188/381; 267/136; 267/196; 267/134
(58) Field of Classification Search ............... 188/381, 188/267, 164, 284, 378; 267/140.15, 136, 267/201, 196, 195, 134
See application file for complete search history.

(56) References Cited

U.S. PATENT DOCUMENTS

| | | | |
|---|---|---|---|
| 4,517,505 A * | 5/1985 | Cunningham | 318/611 |
| 4,957,279 A * | 9/1990 | Thorn | 267/140.5 |
| 5,257,680 A * | 11/1993 | Corcoran et al. | 188/129 |
| 5,277,281 A * | 1/1994 | Carlson et al. | 188/267 |
| 5,284,330 A * | 2/1994 | Carlson et al. | 267/140.14 |
| 5,984,056 A * | 11/1999 | Agnihotri et al. | 188/267.2 |
| 6,378,671 B1 * | 4/2002 | Carlson | 188/267.2 |
| 6,427,813 B1 * | 8/2002 | Carlson | 188/267.2 |
| 7,040,467 B2 * | 5/2006 | Carlson | 188/267 |

FOREIGN PATENT DOCUMENTS

| | | | | |
|---|---|---|---|---|
| JP | 4-331840 A * | 11/1992 | | 267/182 |
| JP | 4-341625 A * | 11/1992 | | 188/267 |
| JP | 2003-144792 A * | 5/2003 | | |

* cited by examiner

*Primary Examiner*—James McClellan
*Assistant Examiner*—Mariano Sy
(74) *Attorney, Agent, or Firm*—Edward F. Murphy, III

(57) ABSTRACT

A friction damper with a housing including a cavity. The damper includes a first member disposed in the cavity and movable in the cavity; a second member disposed in the cavity; an intermediate member between the first and second members, the first member being in frictional engagement with the intermediate member; and at least one magnetic field generator mounted to magnetically couple the first and second members thereby maintaining the first member in frictional engagement with the intermediate member and wherein the first member is movable against the intermediate member to generate a damping force.

6 Claims, 8 Drawing Sheets

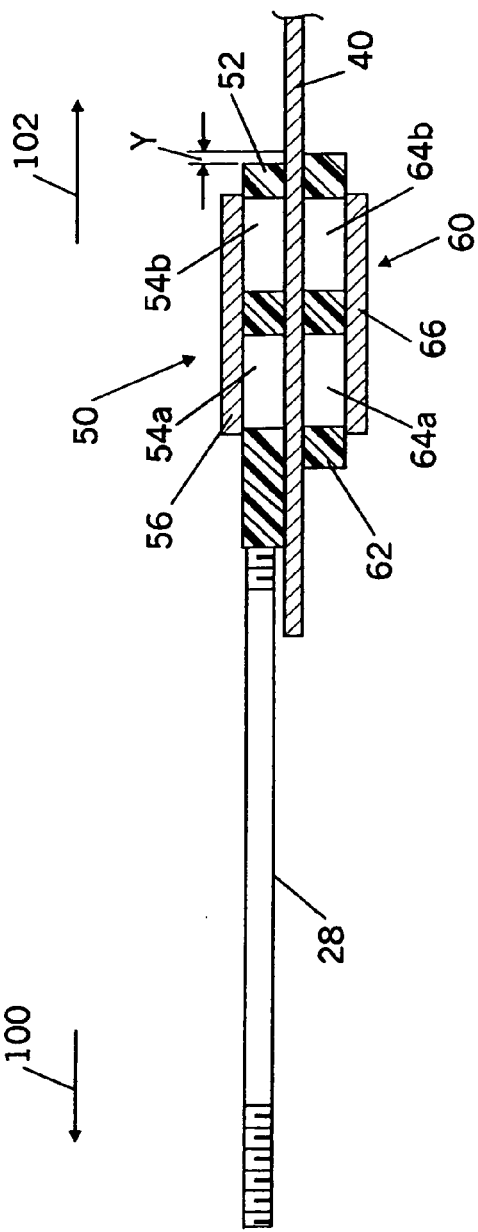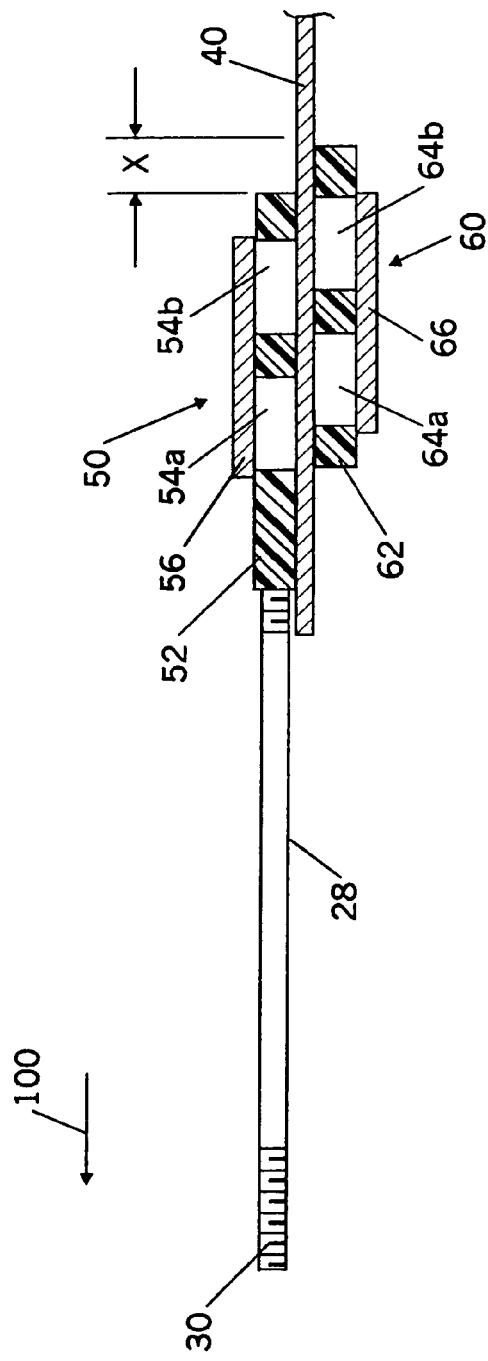
FIG. 4
FIG. 5

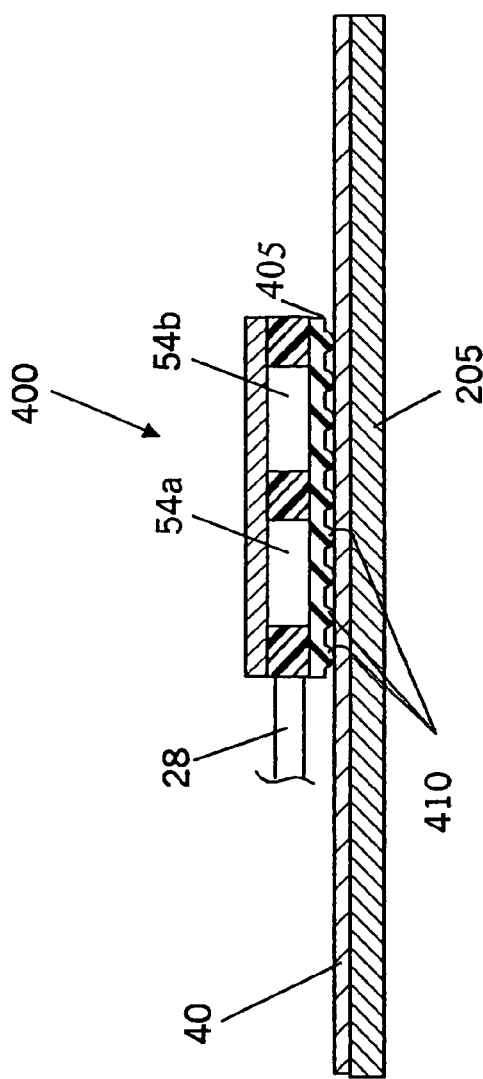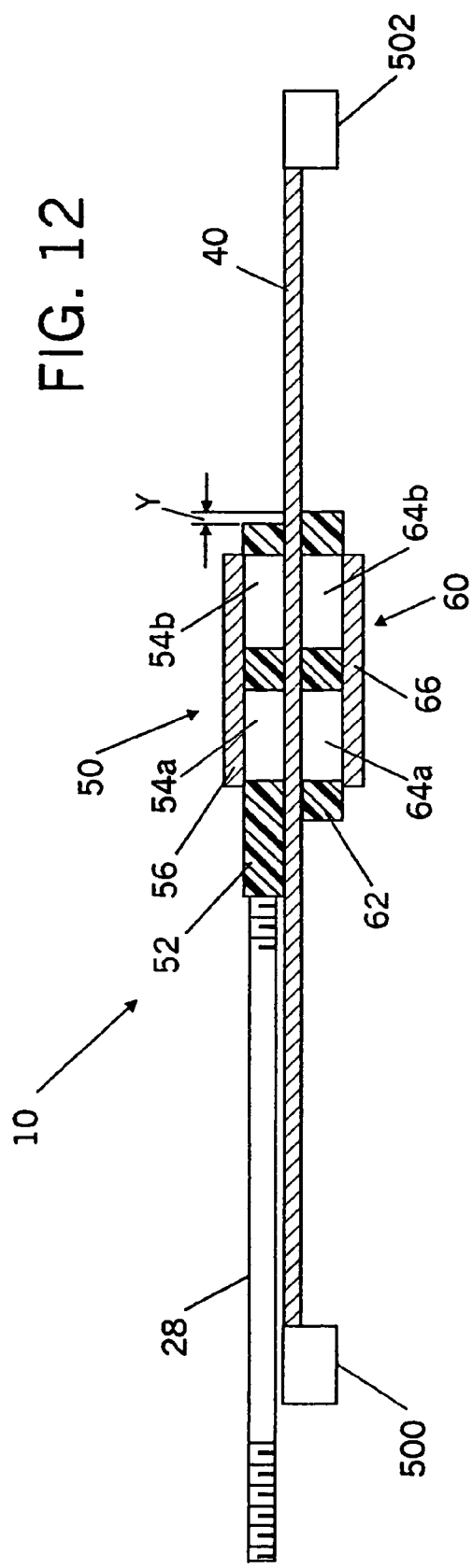

MAGNETICALLY ACTUATED FRICTION DAMPER

This application is a divisional of U.S. patent application Ser. No. 09/737,889, filed Dec. 15, 2000, which is now U.S. Pat. No. 7,040,467.

FIELD OF INVENTION

The invention relates to a passive damper, and more particularly the invention relates to a friction damper where the normal force of the friction is provided by magnetic attraction between first and second damping members.

BACKGROUND OF INVENTION

Friction dampers generally apply a frictional force to a moveable member to dissipate translational or rotational energy of the member to produce acceptable member movement.

Prior art frictional dampers are typically comprised of surface effect dampers of the type described in U.S. Pat. No. 5,257,680 to Corcoran et al., and U.S. Pat. No. 4,957,279 to Thorn. Surface effect dampers operate by dissipating translational or rotational energy by working an elastomeric element to convert kinetic energy to heat. Such conventional dampers are generally comprised of a housing with an inner wall, and an elastomeric member movable through the housing. Interference between the inner wall and the elastomeric member produces the friction damping.

Additionally, frictional damping may be supplied to a movable member by a friction damper that utilizes a controllable fluid to precisely control the supplied damping force. Such devices are well known in the art as magnetorheological (MR) fluid devices and examples of MR devices can be found in commonly assigned U.S. Pat. No. 5,284,330 to Carlson et al.; and U.S. Pat. No. 5,277,281 also to Carlson et al. MR devices may be of the rotary or linear acting variety and such dampers employ a controllable MR fluid comprised of fine soft-magnetic particles disbursed within a liquid carrier. MR fluids exhibit a "thickening" behavior (a rheology change) sometimes referred to as an apparent viscosity change upon being exposed to a magnetic field of sufficient strength. The higher the magnetic field strength exposed to the MR fluid, the higher the damping force that can be achieved with a particular MR device. Although effective in providing damping in a large number of applications, conventional surface effect and MR friction dampers have a number of shortcomings. First, prior art dampers are sensitive to temperature changes and thermal expansion. When the prior art dampers are subjected to significant temperature increases or decreases the viscosity of the MR fluid may be affected and the change in fluid viscosity may in turn affect the supplied damping force. Such temperature changes can also affect the properties of the elastomer damping element and can cause the elastomeric damping element to contract or expand and experience dimensional changes. Changes to the damping element dimensions or properties will change the damping forces supplied by the surface effect friction damper.

Surface effect damping is provided by a carefully calculated interference, between the housing and elastomer element. In MR devices effective damping is ensured by maintaining a precisely defined gap dimension between the housing and piston member. The MR fluid flows through the defined gap. As a result of the foregoing, prior art dampers are very sensitive to dimensional tolerancing and tolerances must be tightly maintained in order for prior art friction dampers to provide effective damping forces. However, overtime, through repetitive use of the dampers, the critical tolerances between moving damper components are frequently lost and the deviations in the part tolerances negatively affects the forces provided by the friction damper. Finally, prior art friction dampers can be difficult to assemble and only a specific range of materials are acceptable for use in such prior art friction dampers.

The foregoing illustrates limitations known to exist in present devices and methods. Thus, it is apparent that it would be advantageous to provide an alternative directed to overcoming one or more of the limitations set forth above. Accordingly, a suitable alternative friction damper is provided including features more fully disclosed hereinafter.

SUMMARY OF THE INVENTION

This is accomplished by the present invention that provides a friction damper that provides effective damping forces without sensitivity to temperature changes or tolerances between component parts; is easily assembled and may incorporate components made from a variety of materials.

In one aspect of the present invention this is accomplished by the friction damper of the present invention. The damper comprises a housing including a cavity formed therein; a first member disposed in said cavity and movable in said cavity; a second member disposed in said cavity; an intermediate member between the first and second members, the first member being in frictional engagement with the intermediate member; and at least one magnetic field generator mounted to magnetically couple the first and second members thereby maintaining the first member in frictional engagement with the intermediate member and wherein the first member is movable against the intermediate member to generate a damping force.

The second member may be movable with the first member. Before the first member is displaced, the first and second members are aligned. When the first member is initially displaced, the second member lags behind the first member by a distance, and then is drawn towards the first member so that the first and second members are substantially aligned. Alternatively, the second member may be fixed. In both instances the first and second members are coupled magnetically and as a result, stiction between moveable damper members is eliminated by the damper of the present invention which provides for a smooth onset of damping force.

Additionally, in an alternate embodiment the first and second members and intermediate members may not be located in housing. In such an embodiment the ends of the intermediate member are fixed.

The foregoing and other aspects will become apparent from the following detailed description of the invention when considered in conjunction with the accompanying drawing figures.

BRIEF DESCRIPTION OF THE DRAWINGS

FIG. 4 is the longitudinal section view of FIG. 1 illustrating the alignment of the first and second members and intermediate member before the first member is moved;

FIG. 5 is the longitudinal section view of FIG. 4 after the first member is displaced;

FIG. 11 is a longitudinal sectional view of the first member, second member, intermediate member and bearing layer of a fourth embodiment of the friction damper of the present invention; and FIG. 12 is a longitudinal sectional view of an alternate embodiment of the present invention with the first and second members and intermediate member unenclosed by a housing with the ends of the intermediate member fixed.

DETAILED DESCRIPTION OF THE PREFERRED EMBODIMENTS

Figure 1:
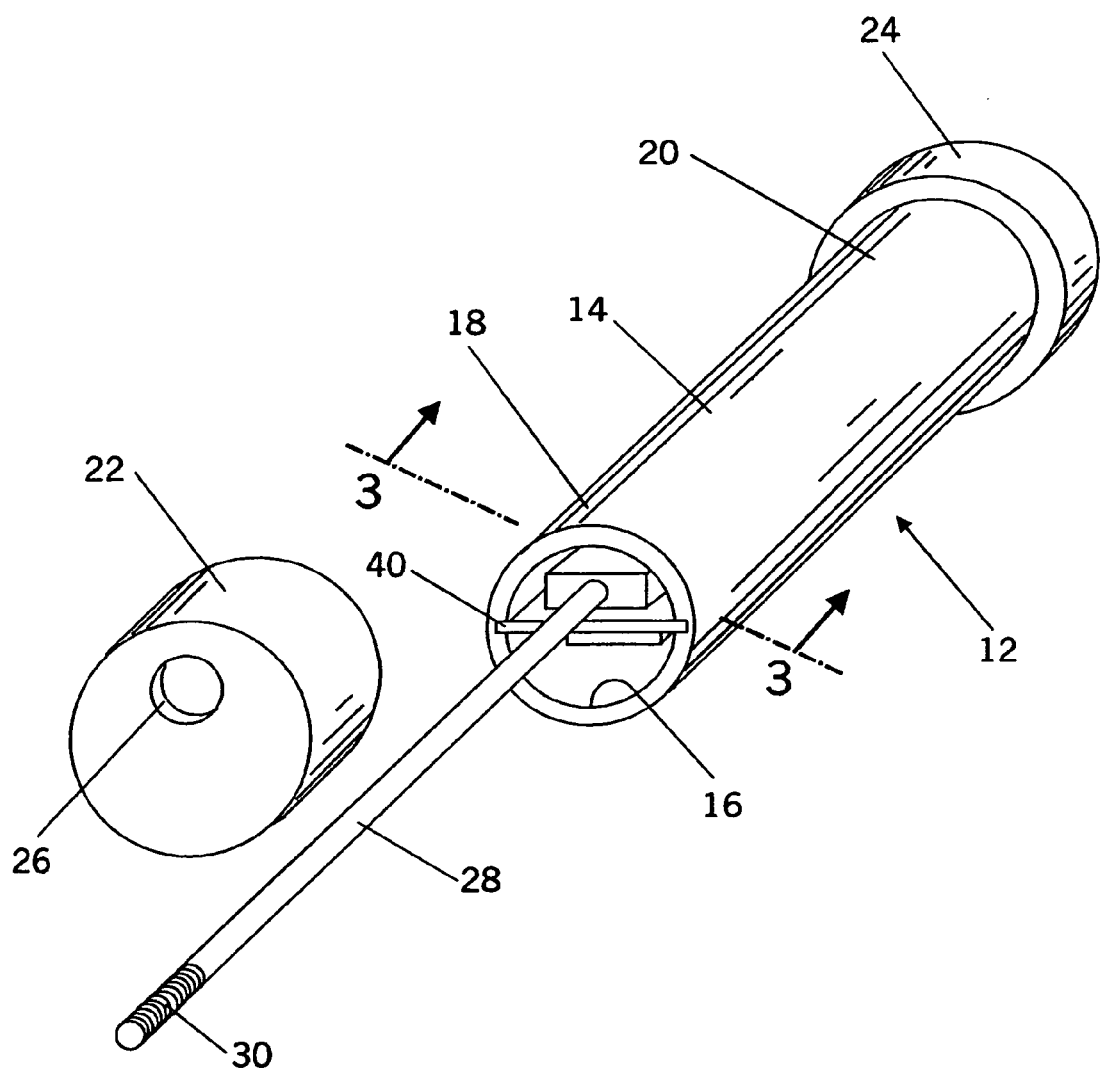
FIG. 1 is an isometric view of the friction damper of the present invention with the housing endcap removed.

Now turning to the drawing figures wherein like parts are referred to by the same numbers in the several views, FIGS. 1-5 disclose a first embodiment friction damper 10.

Friction damper 10 includes an elongate, tubular housing 12 with housing wall 14 that defines an inner housing surface 16 and housing cavity 17. The housing is most preferably made of a non-metallic material such as plastic and although the housing is shown and described as being tubular with a circular cross-section, it should be understood that the housing may have any suitable cross section such as a rectangular or square configuration for example.

The housing includes first and second housing ends 18 and 20 respectively and the ends are closed by respective first and second end caps 22 and 24. At least one of the end caps is removably attached to its respective housing end. For purposes of describing the preferred embodiment of the present invention, end cap 24 is fixed to second housing end 20 and end cap 22 is removably attached to first housing end 18 by a threaded connection, interference fit or other conventional removable attachment means. End cap 22 includes hole 26 through which shaft 28 extends outwardly from the housing cavity so that the shaft end 30 may be connected to a movable component of a toy, haptic device, automobile door or appliance such as a washing machine, for example. Bracket 32 is made integral with end cap 24 and the bracket serves as a means for anchoring the second housing end during operation of the damper 10.

Longitudinally extending opposed slots 34 and 36 are provided along the inner surface of housing wall 14 and the slots open at the housing ends 18 and 20. Slots 34 and 36 are adapted to receive the longitudinal edges of an intermediate member 40. As the description proceeds the intermediate member may also be referred to as an intermediate friction layer. With the longitudinal edges of member 40 located in slots 34 and 36 member 40 extends diametrically across the cavity 17 to divide the larger cavity into smaller first and second cavities 17a and 17b respectively. See FIGS. 1 and 3. The intermediate friction layer 40 may be made from a variety of non-magnetic materials such as polyethylene or other plastics, stainless steel, brass, laminates or composite materials used in brake pads for automotive applications.

The friction damper 10 of the present invention is insensitive to wear and dimensional tolerances. Variations in the thickness of the friction layer 40 due to wear or loose manufacturing tolerances have little effect on damper performance because the normal frictional force loading of the first and second frictional elements 50 and 60 is not determined dimensionally as it is in other friction dampers such as surface effect dampers for example. Thus, even if a large portion of the intermediate member 40 were to be worn away over time, the normal loading force between the elements 50 and 60 would not be affected.

Figure 2:
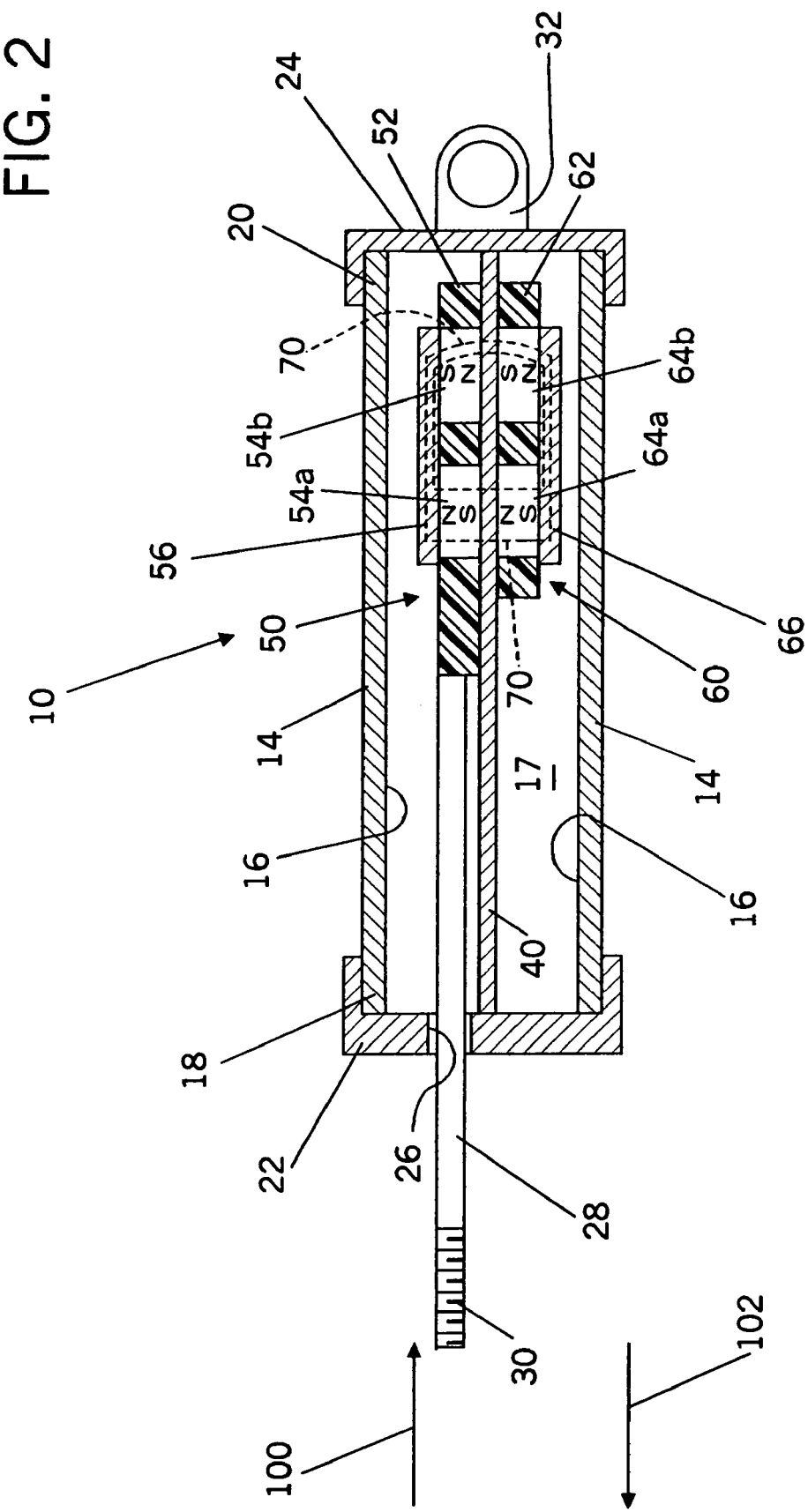
FIG. 2 is a longitudinal sectional view of the damper of FIG. 1.
Figure 3:
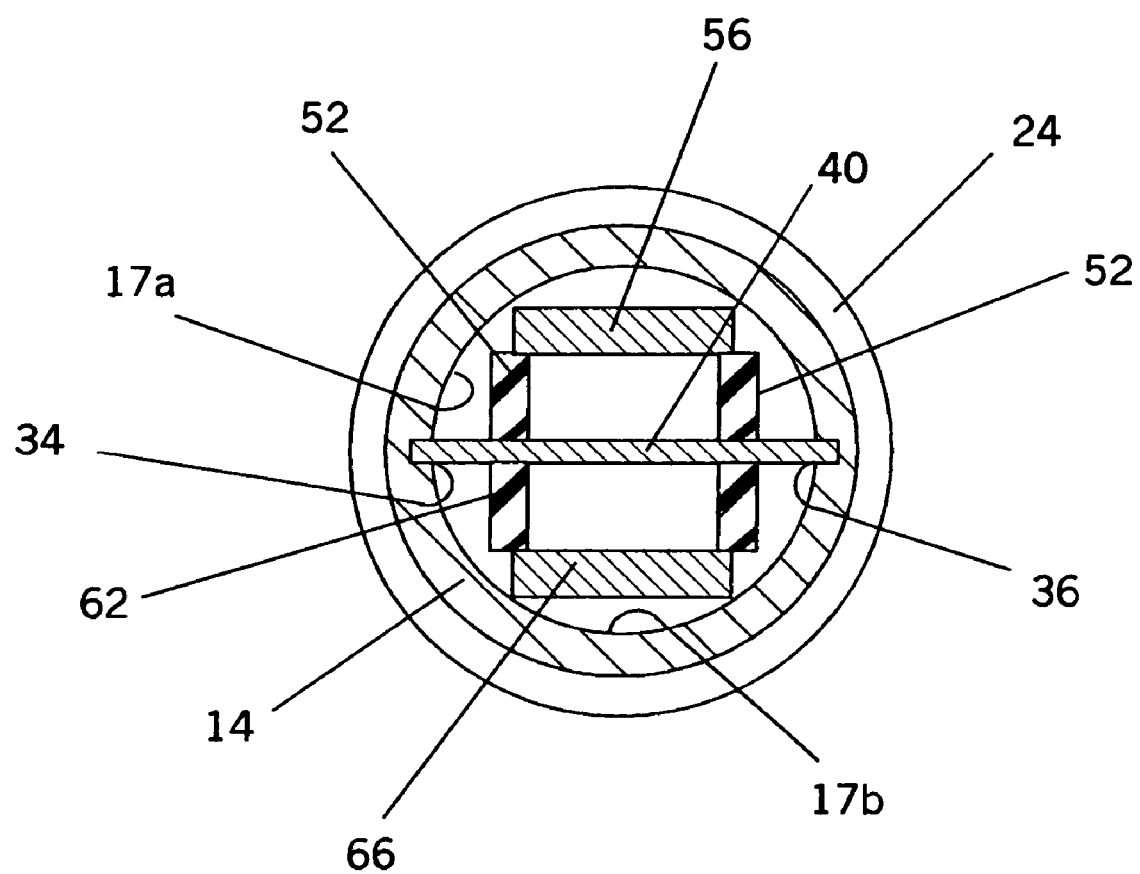
FIG. 3 is a lateral sectional view taken along line 3-3 of FIG. 1.

The first member 50 is located in cavity 17a and is connected to one end of shaft 28 in a conventional manner. The shaft is connected to the nonmagnetic seat 52 of member 50 and the seat in turn supports a pair of permanent magnets 54a, 54b that are located side-by-side in the seat. The seat may be made of any suitable nonmagnetic material such as a plastic or aluminum for example. As shown in FIGS. 2 and 3, when the member 50 is located in cavity 17a, the seat is at all times located on and in frictional engagement with the intermediate member 40 and the magnets 54a, 54b are prevented from becoming unseated by a metallic keeper plate 56 that is attracted to the magnets. In addition to preventing magnet displacement, the plate 56 closes magnetic circuit 70 to produce a reliable and consistent magnetic field. As the shaft 28 is moved axially in either of the directions identified by arrows 100 and 102, the member 50 is moved in the same axial direction and the seat and magnets are maintained in frictional engagement with the member 40.

The second member 60 is located in cavity 17b and is magnetically coupled to member 50. The magnetic coupling is represented by the dashed font representation of magnetic field 70. Like first member 50, second member 60 includes side-by-side magnets 64a, 64b that are supported in seat 62. A keeper plate 66 covers the magnets along one side of the seat. As shown in FIG. 2 the magnets 54a, 54b and 64a, 64b are supported in their respective seats so that their north and south poles are oriented in the manner required to produce the coupling magnetic field 70. The keeper plates 56 and 66 complete the magnetic coupling circuit. In this way, the members 50 and 60 are mutually attracted through the intermediate member 40. When member 60 is located in cavity 17b, seat 62 is at all times in frictional engagement with member 40. As will be described in greater detail hereinbelow, second member 60 moves in the general directions identified by arrows 100 and 102, and follows the movement of first member 50.

It should be understood that the friction damper of the present invention does not need to be in the specific horizontal orientation disclosed for the damper to provide effective damping. Although in FIG. 3 cavity 17a is shown as an upper cavity and cavity 17b is shown as a lower cavity, the orientations of cavities 17a and 17b could be reversed with the cavity 17b as the upper cavity and cavity 17a as the lower cavity or the housing could be rotated to any angle from the position of FIG. 3.

Operation of friction damper 10 will now be described. For simplicity as the description proceeds the operation of damper 10 will be described in terms of movement of member 60 in direction 100. However it should be understood that the damper 10 operates in the same way if moved in direction 102 shown in FIG. 2.

After the damper is assembled, end 24 is fixed via bracket and shaft end 30 is connected to a movable object of interest.

When the damper is assembled the first and second members 50 and 60 are magnetically coupled and are maintained against the surface of member 40 by magnetic field 70.

Turning now to FIGS. 4 and 5, the second member 60 tends to align with the first member 50 due to the magnetic attraction between magnets 54a, 54b and 64a, 64b as shown in FIG. 4. As the first member moves axially along intermediate member 40 in direction 100, the member 60 tends to lag behind or become partially decoupled from the first member 50. See FIG. 5. The lag of member 60 is represented by distance X in FIG. 5. This is because the members 50 and 60 are effectively coupled by a magnetic spring. Although the shaft 28 is directly coupled to the first member, the second member 60 is effectively coupled to the magnetic spring. Thus before the second member begins to follow the movement of the first member the magnetic spring must first be displaced sufficiently to provide enough force to overcome the friction of the first element. Once the second member overcomes the friction of the first element, the second member 60 is rapidly drawn back towards the first member until the first and second members are substantially aligned. As the first member continues to be displaced, the second member lags behind the first member by a relatively small lag distance Y. See FIG. 4.

Figure 7:
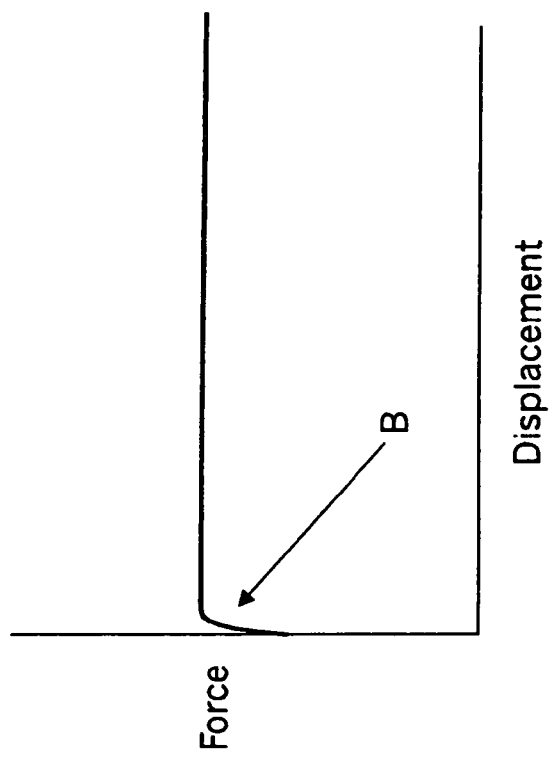
FIG. 7 is a plot of Force versus Displacement for the friction damper of the present invention.
Figure 6:
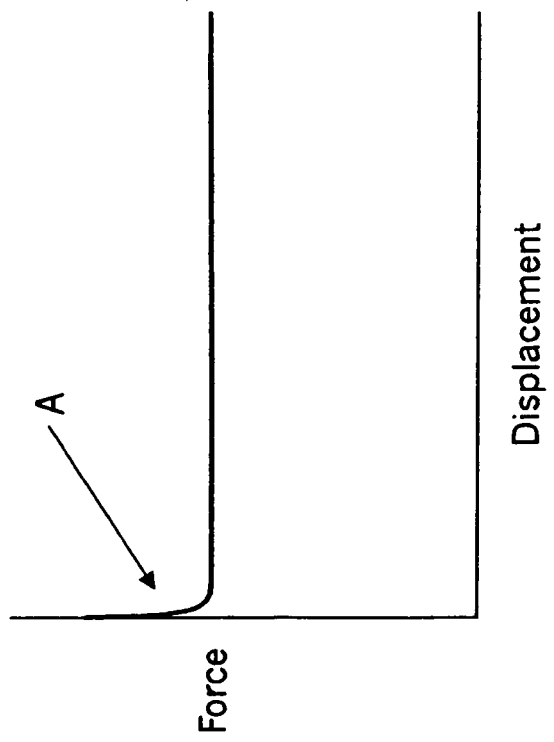
FIG. 6 is a plot of Force versus Displacement for a prior art friction damper.

This partial decoupling of the first and second members provides a significant advantage in terms of the "feel" of the damper. The partial decoupling ameliorates much of the stick-slip normally associated with a friction damper. Such stick-slip is referred to by those skilled in the art as stiction. The effects of stiction in prior art friction dampers are illustrated graphically in FIG. 6. The damping force supplied by a prior art damper initially is high as a result of the resistance to movement because of the presence of stiction and then once the damping element overcomes the forces of stiction at point A of FIG. 6, the damper force is lowered to its operating level. FIG. 7 graphically illustrates the damper of the present invention that provides a smooth, stiction-free increase in force until the damper force reaches its working level. See the point identified as B in FIG. 7.

Figure 8:
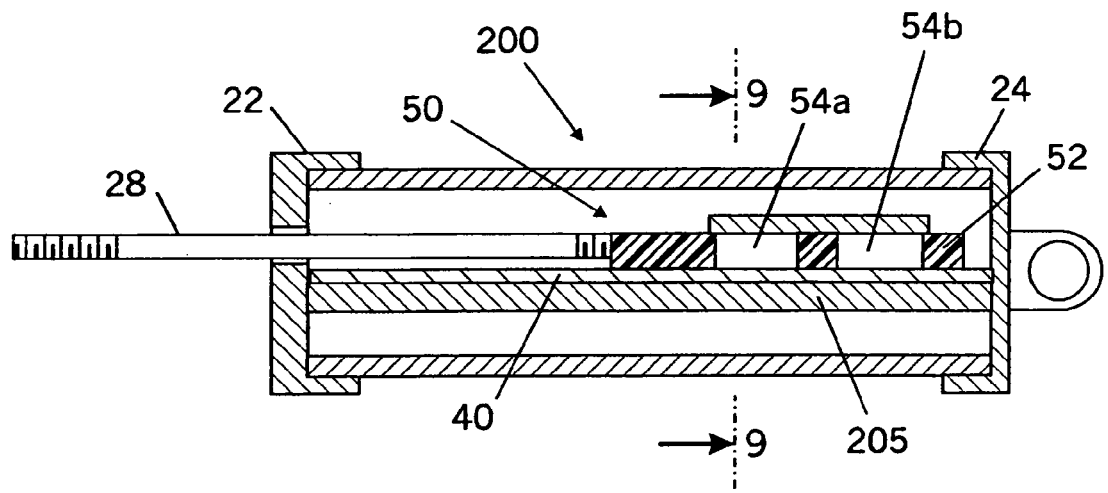
FIG. 8 is a longitudinal section view of a second embodiment friction damper of the present invention.
Figure 9:
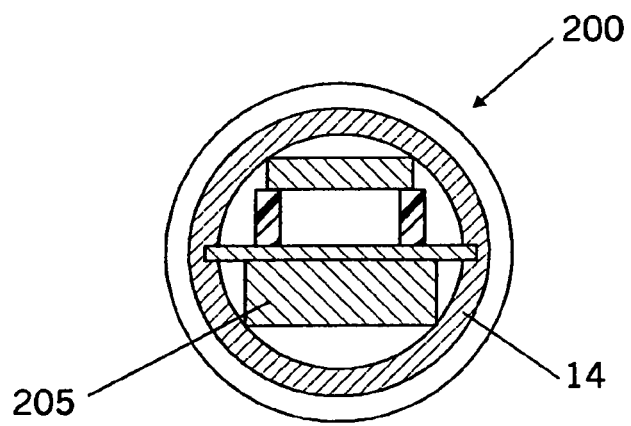
FIG. 9 is a lateral sectional view taken along line 9-9 of FIG. 8.

A second embodiment friction damper 200 is illustrated in FIGS. 8 and 9. The second embodiment friction damper 200 comprises all of the elements comprising friction damper 10 except for the movable second member 60. The second embodiment friction damper includes a stationary second member 205 that spans the longitudinal dimension of the housing. The second member is located in the chamber with the lower member edges located supported on the inner surface of the housing wall. See FIG. 9.

Figure 10:
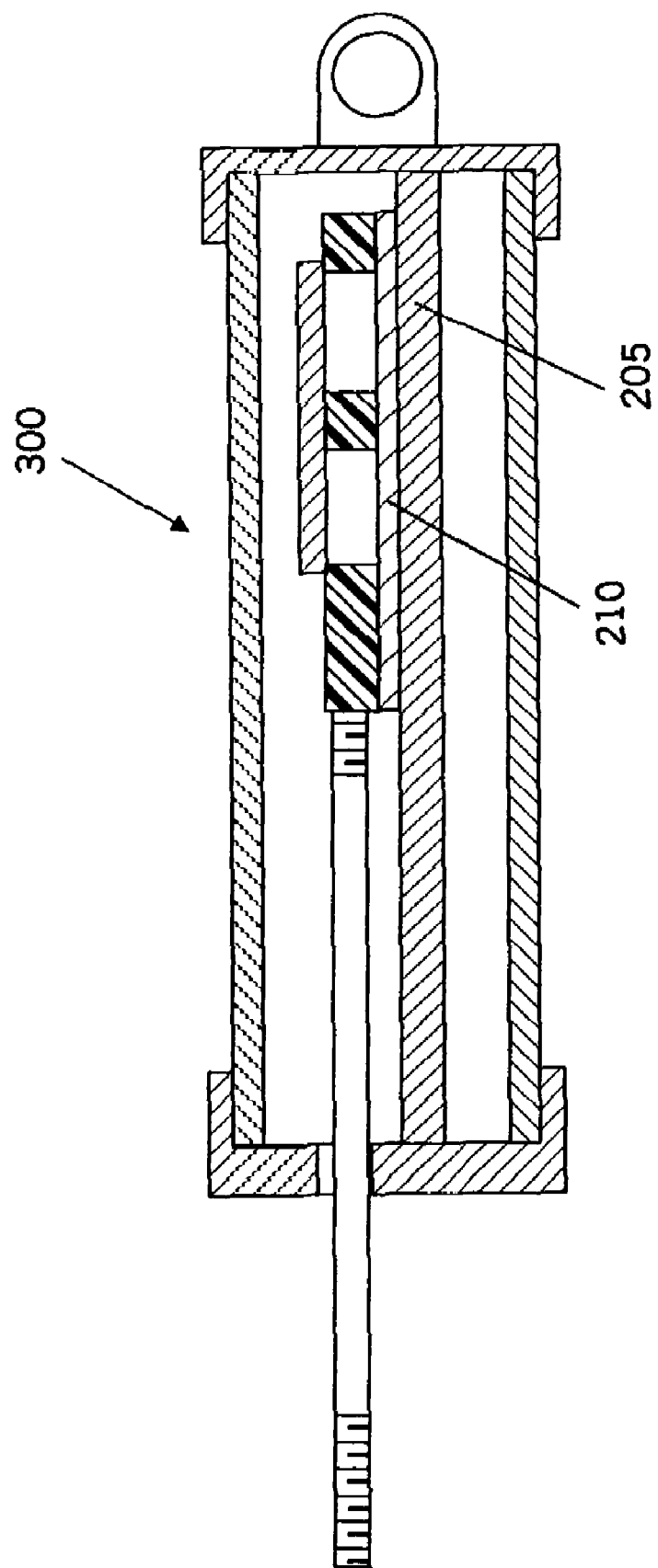
FIG. 10 is a longitudinal section view of a third embodiment friction damper of the present invention.

A third embodiment friction damper 300 is illustrated in FIG. 10. The third embodiment friction damper includes all of the elements of the second embodiment friction damper 200 except for an intermediate member 210 that extends the longitudinal length of the housing. Rather, in the third embodiment friction damper 300, the intermediate member is attached to the underside of the first seat 52 to be moveable with the seat as member 50 is moved relative to the second member. The member 210 is attached by an adhesive or other conventional means. In an alternate embodiment, the friction damper could include both the friction layer 210 along the underside of the seat 52 and intermediate member 40 along the complete length of the second member 205.

A fourth embodiment friction damper 400 is illustrated in FIG. 11. The friction damper includes the features of the second embodiment friction damper 200 and also includes a bearing member 405 that is made of a rubber or other resilient material, and the member 405 is fixed to the underside of the seat 52 in a conventional manner. The bearing member includes a plurality of spaced apart semi-spherical ribs 410 that extend laterally in a parallel manner across the member. The ribs remain in frictional engagement with the intermediate member during operation of the damper 400.

In the second, third and fourth embodiments, the first member 50 is magnetically coupled with the second member 205. The second member is a soft magnetic layer such as iron or steel. In friction dampers 200, 300 and 400 as the first member is moved longitudinally, the smooth stiction free behavior of FIG. 7 is achieved with a smooth increase in the force supplied by the dampers 200, 300 and 400.

In the first through fourth embodiments 100, 200, 300 and 400 the first and second members 50 and 60 and intermediate friction layer 40 may be unenclosed by housing 12. Such a configuration is shown in FIG. 12. In such an alternate configuration, the ends of intermediate member 40 are maintained fixed by attachment members 500 and 502 which may be any suitable attachment member such as a bracket or the like. An alternative to the fixed member ends includes fixing portions of the longitudinal edges of the member 40 in such a manner that does not interfere with the displacement of members 50 and 60.

While I have illustrated and described a preferred embodiment of my invention, it is understood that this is capable of modification, and therefore do not wish to be limited to the precise details set forth, but desire to avail myself of such changes and alterations as fall within the purview of the following claims.

What is claimed is:

1. A damper comprising;
   a housing including a cavity formed therein;
   a first movable member disposed in said cavity and movable in said cavity;
   a second stationary member disposed in said cavity;
   an intermediate member between the first movable member and the second stationary member, the intermediate member being in frictional engagement with the second stationary member; and
   at least one magnetic field generator mounted to magnetically couple the first and second members thereby maintaining the second member in frictional engagement with the intermediate member and the intermediate member is movable against the second member to generate a damping force with the intermediate member fixed to the first member.

2. The damper as claimed in claim 1 wherein the first member comprises a first seat, the at least one magnetic field generator being supported in the first seat, the first member further comprising a keeper to maintain the at least one magnetic field generator in the first seat.

3. The damper as claimed in claim 2 wherein the at least one magnetic field generator of the first member is comprised of a plurality of permanent magnets.

4. The damper as claimed in claim 1 wherein the housing is comprised of a tubular member having a wall defining an inner housing support surface for supporting the second member, the housing further comprising first and second end cap members.

5. The damper as claimed in claim 4 wherein the inner housing support surface for supporting the second member are comprised of opposed longitudinally extending slots.

6. A damper comprising:
   a housing with a housing wall and including a cavity formed therein;

a first movable member disposed in said cavity and movable in said cavity;

a second stationary member disposed in said cavity;

an intermediate member between the first movable member and the second stationary member, the first member being in frictional engagement with the intermediate member; and at least one magnetic field generator mounted to magnetically couple the first and second members thereby maintaining the first member in frictional engagement with the intermediate member, the first member is movable against the intermediate member to generate a damping force, with a friction layer between the intermediate member and the first member, the friction layer comprises a plurality of ribs and the second member is supported by the housing wall.

* * * * *